Oct. 10, 1933.    W. H. FARR    1,930,425
DROP CENTER RIM
Filed April 14, 1931

INVENTOR
WARREN H. FARR
BY
ATTORNEY

Patented Oct. 10, 1933

1,930,425

UNITED STATES PATENT OFFICE 1,930,425

DROP CENTER RIM

Warren H. Farr, Detroit, Mich., assignor to Budd Wheel Company, Philadelphia, Pa., a corporation of Pennsylvania Application April 14, 1931. Serial No. 529,954

4 Claims. (Cl. 152—20)

My invention pertains to the art of drop center rims and the purpose is the solution of the problem of tire throwing so frequently encountered in the use of such rims. I have sought to develop a rim which may be simply and economically fabricated without the use of any additional elements other than those ordinarily employed in the manufacture of drop center rims of a standard type and which will yet effectively prevent the throwing of tires upon the deflation thereof. I have solved this problem by forming a rim having a drop base portion of differential width, portions thereof being so narrow as to effectively preclude the entry of the tire beads upon the deflation of the inner tube.

In the preferred embodiment of my invention the irregularities in the drop base portion of the rim are formed entirely in the inner side wall thereof, thus avoiding the unsightly appearance which would be entailed by the provision of such irregularities in the visible outer surface of the rim.

Another particular object attained by my invention is the provision of a drop center rim affording an adequate surface of attachment to a wheel body and yet effectively precluding the possibility of tire throwing. Other objects and advantages will be obvious from a reading of the sub-joined specification in the light of the attached drawing, in which Fig. 1 is a side elevation of my improved rim.

Figure 2:
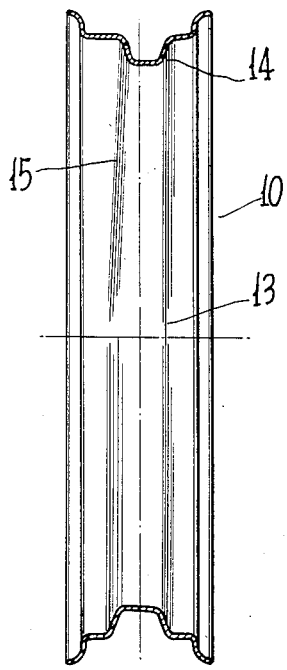
Fig. 2 is a section on the line 2—2 of Fig. 1.
Figure 3:
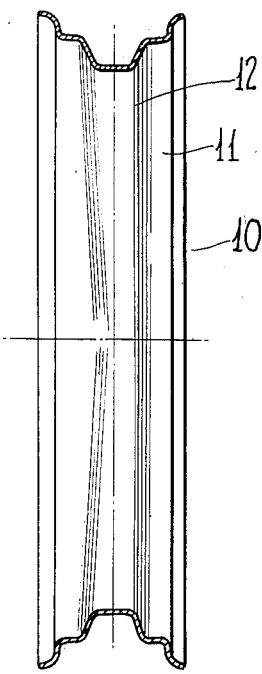
Fig. 3 is a section on the line 3—3 of Fig. 1.
Figure 1:
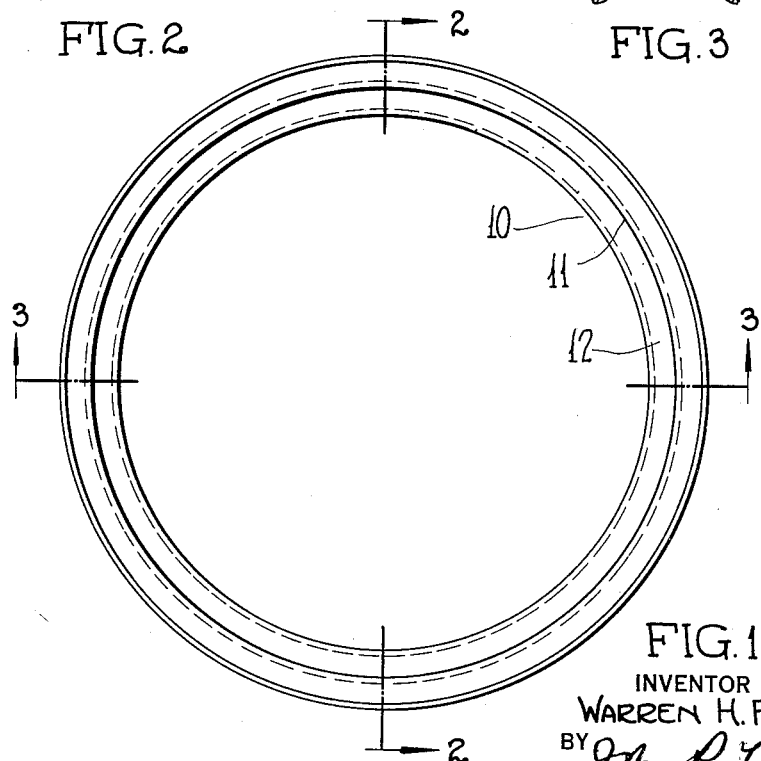

Referring to the drawing by reference characters, the numeral 10 indicates my improved rim which includes the conventional bead seating portions 11 and a drop base portion 12. In order to attain the objects of my invention I have formed this drop base portion 12 of differential width in various portions of its circumference, thereby forming a rim having a constricted circumferential drop base portion of substantial extent. Portions of the drop center of my improved rim are of standard width as indicated at 13, while other portions are substantially constricted as indicated at 14, these constricted and wide portions being interconnected by tapering portions 15 merging gradually into each. The tapering portion of my rim is preferably formed entirely upon the inner side thereof. As a consequence of this fact the rim appears from the side of the vehicle to be a standard rim.

The manner in which I have attained the objects of my invention will now be obvious. It will be seen that the deflated tire cannot enter the drop base portion of the rim accidentally because of the constriction indicated at 14. On the other hand, when it is desired to remove a deflated tire it can be readily entered into the wider portion 13 of the drop base of the rim and removed from the portion opposite the part which enters the drop base. Since the base portion of the rim is concentric with respect to other portions of the wheel, a circular wheel body can be mounted directly within this base portion. The drop base of the rim is thus adapted to receive wire wheel spokes of uniform length or a circular disc body without modification. This feature represents a very substantial advance over drop center rims of the eccentric type heretofore known in the prior art.

Modifications will be obvious to those skilled in the art and I do not therefore wish to be limited except by the scope of my sub-joined claims as interpreted in the light of the generic spirit of my invention.

What I claim is:

1. A drop center rim including a drop base portion having a circular outer side wall and an inner side wall having corresponding elements of its circumference in gradually diverging relationship thereto, said drop base portion being of uniform depth throughout its entire circumferential extent.

2. A drop center rim including bead seating portions and a drop base portion, said base portion having plural sections of gradually tapered width, and said drop base portion being of uniform depth throughout its entire circumferential extent.

3. A drop center rim including bead seating portions, a drop base portion and side walls interconnecting said bead seating portions, and said drop base portion, said side walls gradually converging and diverging axially throughout a portion of their circumference, said drop base portion being of uniform depth throughout its entire circumferential extent.

4. A drop center rim including bead seating portions and a drop base portion of uniform width throughout substantially half of its circumference, and of a progressively tapered width throughout the balance of its circumference, said drop base portion being of uniform depth throughout its entire circumferential extent.

WARREN H. FARR.